US010574721B2

(12) United States Patent
Bazzi et al.

(10) Patent No.: US 10,574,721 B2
(45) Date of Patent: Feb. 25, 2020

(54) SYSTEMS AND METHODS FOR AN AUTOMATIC FRESH BROWSER INSTANCE FOR ACCESSING INTERNET CONTENT

(71) Applicant: The Arizona Board of Regents for and on Behalf of Arizona State University, Tempe, AZ (US)

(72) Inventors: Rida A. Bazzi, Scottsdale, AZ (US); Mohsen Zohrevandi, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 14/563,712

(22) Filed: Dec. 8, 2014

(65) Prior Publication Data

US 2016/0164946 A1 Jun. 9, 2016
US 2017/0048298 A9 Feb. 16, 2017

Related U.S. Application Data

(60) Provisional application No. 61/912,716, filed on Dec. 6, 2013.

(51) Int. Cl.
*H04L 29/08* (2006.01)
*G06F 21/52* (2013.01)
*G06F 21/62* (2013.01)

(52) U.S. Cl.
CPC .............. *H04L 67/02* (2013.01); *G06F 21/52* (2013.01); *G06F 21/6263* (2013.01)

(58) Field of Classification Search
CPC ....... H04L 67/02; G06F 21/53; G06F 21/6263

USPC ......................................................... 709/219
See application file for complete search history.

(56) References Cited

U.S. PATENT DOCUMENTS 5,974,549 A * 10/1999 Golan ..................... G06F 9/468
714/47.3
8,095,967 B2 * 1/2012 Loesch ............. G06F 17/30902
726/22
8,359,402 B2 * 1/2013 Cross ................ H04L 29/12066
709/233

(Continued)

OTHER PUBLICATIONS

M. Zohrevandi & R. Bazzi, "Auto-FBI: A User-friendly Approach for Secure Access to Sensitive Content on the Web", Proceedings of the 29th Annual Computer Security Applications Conference (ASSAC '13), Dec. 9-13 2013, pp. 349-358, 2013.

(Continued)

*Primary Examiner* — Esther B. Henderson
*Assistant Examiner* — Nazia Naoreen
(74) *Attorney, Agent, or Firm* — Polsinelli PC

(57) ABSTRACT

A system and method for securing access to sensitive content on the web is disclosed. The approach automates compartmentalization practices for accessing different kinds of content with different browser instances. The automation is transparent to the user and does not require any modification of how non-sensitive content is accessed. For sensitive content, a Fresh Browser Instance (FBI) is automatically created to access the content. In addition, the automatic FBI system may provide support for novice users with predefined sensitive content sites as well as for more experienced users who can define conflict of interest (COI) classes which allows content from sites in the same user-defined class to coexist in a browser instance.

18 Claims, 8 Drawing Sheets

(56) References Cited

U.S. PATENT DOCUMENTS

| | | | | |
|---|---|---|---|---|
| 9,055,048 | B2* | 6/2015 | Shepherd | G06F 21/62 |
| 9,418,243 | B2* | 8/2016 | Bauer | G06F 21/6263 |
| 2008/0250159 | A1* | 10/2008 | Wang | G06F 21/6218 |
| | | | | 709/239 |
| 2011/0167492 | A1* | 7/2011 | Ghosh | G06F 9/54 |
| | | | | 726/23 |
| 2013/0239231 | A1* | 9/2013 | Korycki | H04L 67/34 |
| | | | | 726/29 |
| 2015/0278311 | A1* | 10/2015 | Isherwood | G06F 17/30705 |
| | | | | 707/741 |

OTHER PUBLICATIONS

A. Barth, C. Jackson, and J. C. Mitchell, "Robust defenses for cross-site request forgery", Proceedings of the 2008 ACM conference on Computer and Communications Security, CCS'08, pp. 75-88, 2008.

N. Bielova, D. Devriese, F. Massacci, and F. Piessens, :Reactive non-interference for a browser model, Proceedings of the 2011 international conference on Network and System Security, NSS'11, pp. 97-104, 2011.

D. F. C. Brewer and M. J. Nash, "The Chinese wall security policy", In Security and Privacy, 1989. Proceedings., 1989 IEEE Symposium on, pp. 206-214. IEEE, 1989.

R. Capizzi, A. Longo, V. N. Venkatakrishnan, and A. P. Sistla, "Preventing information leaks through shadow executions", Annual Computer Security Applications Conference, 2008, ACSAC'08, pp. 322-331, 2008.

E. Y. Chen, J. Bau, C. Reis, A. Barth, and C. Jackson, :App isolation: get the security of multiple browsers with just one, Proceedings of the 18th ACM conference on Computer and communications security, CCS '11, pp. 227-238, 2011.

W. De Groef, D. Devriese, N. Nikiforakis, and F. Piessens, "Flowfox: a web browser with flexible and precise information flow control", Proceedings of the 2012 ACM conference on Computer and Communications Security, CCS'12, pp. 748-759, 2012.

D. Devriese and F. Piessens, "Noninterference through secure multi-execution", Proceedings of the 2010 IEEE Symposium on Security and Privacy, SP'10, pp. 109-124, 2010.

T. Garfinkel, "Traps and pitfalls: Practical problems in system call interposition based security tools", Proceedings of the 2003 Network and Distributed Systems Security Symposium, vol. 33 of NDSS'03, 2003.

B. Hicks, S. Rueda, D. King, T. Moyer, J. Schiffman, Y. Sreenivasan, P. McDaniel, and T. Jaeger, "An architecture for enforcing end-to-end access control over web applications", Proceedings of the 15th ACM symposium on Access control models and technologies, SACMAT'10, pp. 163-172, 2010.

C. Jackson, A. Barth, A. Bortz, W. Shao, andD. Boneh, "Protecting browsers from dns rebinding attacks", ACM Transactions on the Web (TWEB), 3(1):2, 2009.

D. Jang, R. Jhala, S. Lerner, and H. Shacham, "An empirical study of privacy-violating information flows in javascript web applications", Proceedings of the 2010 ACM conference on Computer and Communications Security, CCS'10, pp. 270-283, 2010.

M. Johns, "On javascript malware and related threat", Journal in Computer Virology, 4(3):161-178, 2008.

E. Kirda and C. Kruegel, "Protecting users against phishing attacks", The Computer Journal, 49(5):554-561, 2006.

N. Provos, P. Mavrommatis, M. A. Rajab, and F. Monrose, "All your iframes point to us", Proceedings of the 2008 Security Symposium, SS'08, pp. 1-15, 2008.

G. Rydstedt, E. Bursztein, D. Boneh, and C. Jackson, "Busting frame busting: a study of clickjacking vulnerabilities at popular sites", IEEE Oakland Web 2.0,Security an Privacy Workshop, 2010.

Z. Weinberg, E. Y. Chen, P. R. Jayaraman, and C. Jackson, "I still know what you visited last summer: Leaking browsing history via user interaction and side channel attacks", Proceedings of the 2011 IEEE Symposium on Security and Privacy, SP'11, pp. 147-161, 2011.

Aggarwal, et al., "An Analysis of Private Browsing Modes in Modern Browsers," in USENIX Security Symposium, 2010, pp. 79-94.

Akhawe, et al., "Towards a Formal Foundation of Web Security," Computer Security Foundations Symposium, Proceedings of, IEEE, vol. 0, pp. 290-304,2010.

Baron. 2010. Preventing attacks on a user's history through CSS :visited selectors. http://dbaron.org/mozilla/visited-privacy.

Barth, et al., "The Security Architecture of the Chromium Browser," 2008 Technical Report.

Barth, Internet Engineering Task Force (IETF). Request for Comments: 6265, 2011.

Barth, Internet Engineering Task Force (IETF). Request for Comments: 6454, 2011.

Cook, "The Next Big Browser Exploit," CSO Magazine, p. 15, Feb 2008.

Cox, et al., "A Safety-Oriented Platform for Web Applications," in IEEE Symposium on Security and Privacy, 2006, pp. 350-364.

Crites, et al., "OMash: enabling secure web mashups via object abstractions," in ACM Conference on Computer and Communications Security, 2008, pp. 99-108.

Ditchendorf, "Fluid," 2013. [Online] Available: https://web.archive.org/web/20131203233829/http://fluidapp.com/.

Felten, et al., "Timing attacks on web privacy," in Proceedings of the 7th ACM Conference on Computer and Communications Security. ACM, 2000, pp. 25-32.

Flanagan, JavaScript: the definitive guide. O'Reilly Media, 2011.

Google, "Packaged Apps," 2013. [Online] Available: https://web.archive.org/web/20131013145741/http://developer.chrome.com/extensions/apps.html.

Google, "Verified Author," 2019. [Online] Available: http://www.google.com/support/chrome_webstore/bin/answer.py?hl=en&answer=173657.

Grier, et al., "Secure Web Browsing with the OP Web Browser," in IEEE Symposium on Security and Privacy, 2008, pp. 402-416.

Hammer-Lahav, "Web Host Metadata," 2010, http://tools.ietf.org/html/draft-hammer-hostmeta-13.

Huang, et al., "Protecting Browsers from Cross-Origin CSS Attacks," in ACM Conference on Computer and Communications Security), 2010.

Iverson, "Two Web Browsers can be More Secure than One." 2012. [Online] Available: https://web.archive.org/web/20120117034514/http://www.blueridgenetworks.com/securitynowblog/dual-web-browsers-can-avoid-information-disclosures.

Jackson et al., "Beware of Finer-Grained Origins," in Web 2.0 Security and Privacy, 2008.

Jackson, "Alloy: a lightweight object modelling notation," ACM Transactions on Software Engineering and Methodology (TOSEM), vol. 11, No. 2, pp. 256-290, 2002.

Jackson, et al., "Protecting browser state from web privacy attacks," in Proceedings of the 15th International Conference on World Wide Web, ser. WWW '06. New York, NY, USA: ACM, 2006, pp. 737-744. [Online]. Available: http://doi.acm.org/10.1145/1135777.1135884.

Kerschbaum, "Simple cross-site attack prevention," in Security and Privacy in Communications Networks and the Workshops, 2007. Secure Comm 2007. Third International Conference on, Sep. 2007, pp. 464-472.

Morin, "Announcing Facebook Connect," 2008. [Online] Available: https://web.archive.org/web/20100529002343/https://developers.facebook.com/blog/post/108/.

Mozilla Foundation Security Advisory 2009-29, "Arbitrary code execution using event listeners." http://www.mozilla.org/security/announce/2009/mfsa2009-29.html.

Mozilla, "CSP specification," 2011, https://wiki.mozilla.org/Security/CSP/Specification#Report-Only_mode.

Mozilla, "Manifest File," 2012. [Online] Available: https://web.archive.org/web/20120303110855/https://developer.mozilla.org/en/OpenWebApps/The_Manifest.

(56) References Cited

OTHER PUBLICATIONS

Mozilla, "Prism," 2012. [Online] Available: https://web.archive.org/web/20120503194318/http://prism.mozillalabs.com/.
Mozilla, "Test Pilot," https://testpilot.mozillalabs.com/.
Oda, et al., "SOMA: Mutual Approval for Included Content in Web Pages," in ACM Conference on Computer and Communications Security, 2008.
Reis, et al., "Isolating Web Programs in Modern Browser Architectures," in ACM European Conference on Computer Systems (EuroSys), 2009.
Silbey, et al., "Understanding and working in Protected Mode Internet Explorer," 2009. [Online] Available: https://web.archive.org/web/20090302054837/http://msdn.microsoft.com/en-us/library/bb250462(printer).aspx.
Software Abstractions: Logic, Language, and Analysis. The MIT Press, 2006.
Stamm, et al., "Reining in the Web with Content Security Policy," in International Conference on World Wide Web (WWW), 2010.
Wang, et al., "The Multi-Principal OS Construction of the Gazelle Web Browser," in USENIX Security Symposium, 2009, pp. 417-432.

\* cited by examiner

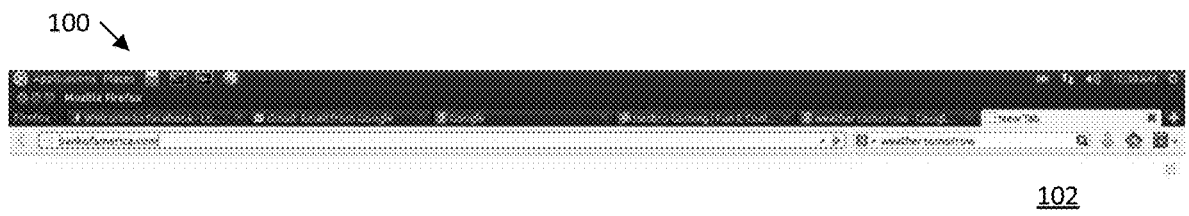
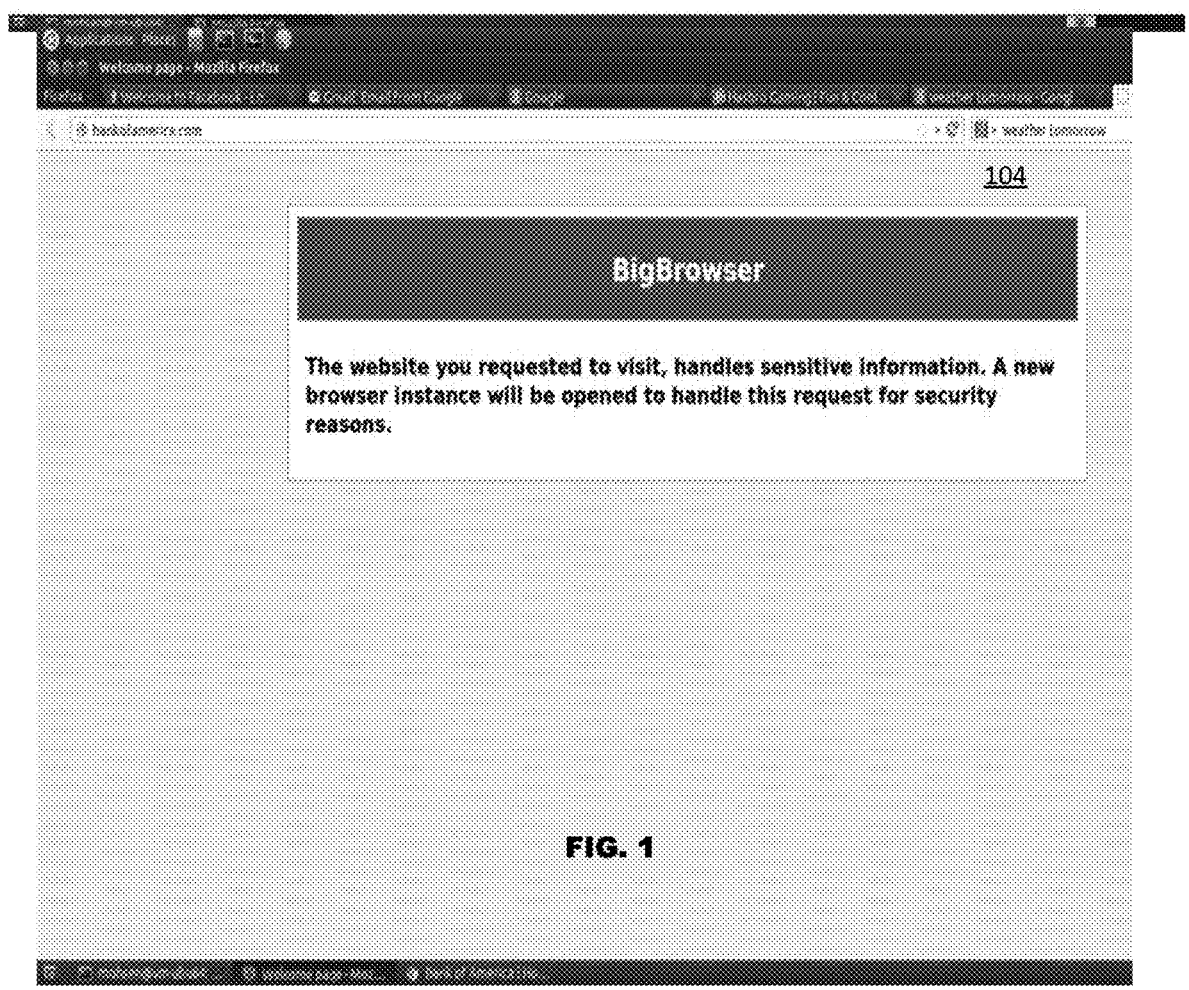
FIG. 1

Figure 3: Example COI classes written by an experienced user

Figure 4: Execution scenario for handling access to content from a different COI class

| Website URL | Caching Disabled ||||| Caching Enabled |||||
|---|---|---|---|---|---|---|---|---|---|---|
| | $T^1_{norm}$ | $T^1_{tracer}$ | $\Delta T^1$ | $\Delta T^1\%$ | | $T^2_{norm}$ | $T^2_{tracer}$ | $\Delta T^2$ | $\Delta T^2\%$ |
| www.youtube.com | 800.6 | 1249 | 448.4 | 56.01 | | 696.1 | 1114.5 | 418.4 | 60.11 |
| www.yahoo.com | 953.3 | 890.1 | -63.2 | -6.63 | | 869.7 | 1133.3 | 263.6 | 30.31 |
| login.live.com | 701.1 | 817.8 | 116.7 | 16.65 | | 655.9 | 498.4 | -157.5 | -24.01 |
| www.msn.com | 368.9 | 772 | 403.1 | 109.27 | | 367.2 | 613.2 | 246 | 66.99 |
| en.wikipedia.org | 2101.3 | 2199.5 | 98.2 | 4.67 | | 823.4 | 1037.6 | 214.2 | 26.01 |
| blogsofnote.blogspot.com | 522.1 | 1016.7 | 494.6 | 94.73 | | 355.8 | 525.9 | 170.1 | 47.81 |
| www.baidu.com | 1433.3 | 954.6 | -478.7 | -33.40 | | 848.5 | 589.3 | -259.2 | -30.55 |
| www.microsoft.com | 1269.5 | 2175 | 905.5 | 71.33 | | 1606.3 | 1827.9 | 221.6 | 13.80 |
| www.qq.com | 6430.9 | 8179.3 | 1748.4 | 27.19 | | 2717 | 3438.5 | 721.5 | 26.56 |
| www.bing.com | 184.1 | 267.5 | 83.4 | 45.30 | | 172.6 | 256.7 | 84.1 | 48.73 |
| www.ask.com | 952 | 1184.5 | 232.5 | 24.42 | | 891.8 | 1034 | 142.2 | 15.95 |
| www.adobe.com | 1394.6 | 2225.9 | 831.3 | 59.61 | | 974.8 | 1626.2 | 651.4 | 66.82 |
| www.taobao.com | 2435.7 | 3286.1 | 850.4 | 34.91 | | 1802.2 | 2625.4 | 823.2 | 45.68 |
| twitter.com | 401.6 | 503 | 101.4 | 47.66 | | 325.4 | 447.9 | 122.5 | 37.65 |
| www.youku.com | 6427.5 | 5731.2 | -696.3 | -10.83 | | 2009.1 | 2638.5 | 629.4 | 31.33 |
| www.sino.com | 947.1 | 983.5 | 36.4 | 3.84 | | 647.4 | 672.5 | 25.1 | 3.88 |
| wordpress.com | 601.4 | 790.6 | 189.2 | 32.96 | | 370 | 548.9 | 178.9 | 48.35 |
| www.sohu.com | 5601.8 | 7031 | 1429.2 | 25.51 | | 4696.7 | 6596.9 | 1900.2 | 40.46 |
| www.hao123.com | 4598.4 | 4600.2 | 1.8 | 0.04 | | 2276.5 | 2441.5 | 165 | 7.25 |
| www.facebook.com | 424.9 | 791.7 | 366.8 | 86.33 | | 411.7 | 534.7 | 123 | 29.88 |
| Average for fast sites | 623.37 | 851.4 | 228.03 | 36.58 | | 600.74 | 759.51 | 158.77 | 26.43 |
| Average for slow sites | 3521.44 | 4042.53 | 521.09 | 14.8 | | 2517.97 | 3261.45 | 743.48 | 29.53 |
| Overall (20 URLs) | 1927.3 | 2287.4 | 359.9 | 18.67 | | 1175.9 | 1510.1 | 334.2 | 28.42 |

Table 1: Performance evaluation for the tracer, times are in milliseconds

FIG. 5

SYSTEMS AND METHODS FOR AN AUTOMATIC FRESH BROWSER INSTANCE FOR ACCESSING INTERNET CONTENT

CROSS REFERENCE TO RELATED APPLICATIONS

This application claims benefit to U.S. provisional application Ser. No. 61/912,716 filed on Dec. 6, 2013, which is incorporated by reference in its entirety.

Aspects of the present disclosure relate to a system for securing access to sensitive content on the Internet, and in particular to a system for accessing different kinds of content with different browser instances.

GOVERNMENT SUPPORT

This invention was made with government support under 0849980 awarded by the National Science Foundation. The government has certain rights in the invention.

BACKGROUND

Content delivered through web browsers continues to be a major vector of attack in personal computing systems. A large variety of attacks exploit what might be termed convenience features of browser content. Executing scripts, such as JavaScript, in web browsers enable a richer browsing experience and enabling cookies allow for the convenience of maintaining a state across multiple pages. Unfortunately, convenience features also enable richer attack modalities. The tension between providing richer content and providing security is real and it is not only due to technical reasons; the more features a system has, the less likely it is for a novice, or even for an experienced user, to get the system settings right. Default browser security settings do not do much to mitigate the situation. Unless security settings are draconian in nature, such as disabling all active content for example (which will also diminish the browsing experience) they do not solve the problems introduced by these convenience features. The possibility that a browser process is compromised by malicious content increases with the usage of the process. The more sites are visited, the more likely it is that malicious content is running in the browser.

Accessing many sources of content on a browser may result in a difficulty for the user to locate tabs and content. For example, a user might have multiple windows open at a time and in order to locate particular content might have to look in multiple windows, which is tedious. A method is needed to facilitate the organization of content in web browsers into different categories without extra overhead incurred by the user.

It is with these concepts in mind, among others, that aspects of the present disclosure were conceived.

SUMMARY

Aspects of the present disclosure include systems, methods, and/or non-transitory computer readable mediums for automatic fresh browser instance system allowing different categories of content to be displayed in different independent browser instances. The systems and/or methods include at least one computing device that includes an enforcer to ensure that web content satisfying two different categorizations is not accessed by a first browser instance of a web browser and an enabler to generate a second browser instance of the web browser to access a portion of the web content that satisfies one category of the at least two different categories.

BRIEF DESCRIPTION OF THE DRAWINGS

FIG. 1 are screen shots of a request to a third party entity and a message display for the automatic fresh browser instance (FBI) system;

FIG. 5 is TABLE 1 showing a performance evaluation for a tracer;

Corresponding reference characters indicate corresponding elements among the various views of the drawings. The headings used in the figures should not be interpreted to limit the scope of the claims.

DETAILED DESCRIPTION

Figure 2:
FIG. 2 is a screen shot of two different browsers for the automatic FBI system.

Aspects of the present disclosure involve an automatic fresh browser instance ("FBI") system ("FBI system") for implementing a process that automates compartmentalization practices for accessing different kinds of Internet content with different browser instances. For example and in various aspects, the FBI system may use system-call interception to restrict connections to web servers, which requires tracing all system calls made by a given instance of a web browser. In another example, the FBI system may use browser extensions to obtain the URL that the browser is attempting to access. Additionally, in order not to interfere with browser functionality, sites for which access is restricted for a given instance are serviced through a combination of DNS-query rewriting and replacement of restricted pages with default pages. In order to keep track of all active browser instances and their conflict of interest ("COI") classes, a daemon outside the browser keeps track of active instances and launches new instances as needed. To communicate the URL of the website being accessed to the daemon, an intermediate process forwards messages between the browser extension and the daemon. Finally, to avoid buffer overflow attacks, URLs may be read using constant-bounds while loops.

According to other aspects, the FBI system may automatically launche an FBI whenever the current browser instance should not be used to handle a requested website. The launched browser need not be the same as its launcher; for example, the launched browser can be Firefox while the launcher can be Chrome, for example.

Not all users are equally savvy in setting security preferences. Accordingly, for certain FBI system users, such as for example a or novice user, a default usage model may be employed that allows safe browsing for and does not change the way users access the Internet. Alternatively, for more experienced users, a nuanced usage model is employed by the FBI system that allows users to define simple yet powerful security preferences to allow them to access multiple sites in the same conflict of interest (COI) instance.

Contributions

In one embodiment, the FBI system provides protection against information leakage (privacy protection) as well as protection against some active attacks (integrity threats); such as cross site request forgery and clickjacking attacks are prevented. Stated differently, no unauthorized access to sensitive content can be done using these attacks.

In another embodiment, the automatic FBI implements an effective approach for providing secure access to sensitive content for a novice user, while allowing an experienced user to specify COI classes of content that can coexist in a browser instance.

The FBI system is as an effective, easy to use, and general approach for providing secure access to sensitive content for novice users. Unlike other approaches, the FBI system approach is tolerant of privacy as well as integrity attacks while being browser-independent.

System and Threat Model

The disclosed FBI system consists of a client side and a server side. Web clients typically run in web browsers. Web browsers retrieve web content delivered by web servers. Web servers and web content have origins associated with them. Web content is acted upon by the web browser. Content might be active which requires the browser to execute some code to process it. The FBI system includes or otherwise implements a browser that processes content from a given origin to be a delegate of the origin. Web content is retrieved using web queries, which can be a simple query that specifies the address of the content in the form of a URL (uniform resource locator) which consists of a domain name and file path or an active query that consists of the above and parameters that are passed to server-side code—scripts—that use the parameters to process the query. A web server might require credentials from a web browser in order to authenticate the principal requesting queries. Credentials are typically provided when initial access is requested, typically in the form of a login id and password. Once credentials are approved, a cookie is stored by the browser to be used for future authentication. At that point the browser acts as a delegate of the authenticated principal.

An instance of a web browser is a software process that executes the browser code and has associated with it a profile which includes information such as preferences, browsing history, cookies, bookmarks, and saved passwords. A profile captures an execution state of the browser. When a browser exits, some information might be deleted from the profile, non-persistent cookies for example, but other information in the profile is saved. When a browser is restarted after exiting, the profile provides continuity between the old browser process and the new process.

Given that a browser instance can be processing content from different sources, and therefore is a delegate for these sources, it is important that these various roles do not get mixed together in the browser. For example, a script running in a browser on behalf of one source should not be able in general to read data associated with another source in the browser—such as passwords being entered in a form. Such restrictions are expressed as security policies and are enforced by the browser. Unfortunately, given the great flexibility provided by the browser, scripts have the ability to obtain information indirectly through attempted access to forbidden resources and to communicate directly and indirectly with their origins. This flexibility makes it hard to enforce policies and even when policies are correctly enforced, they might still allow undesired behavior. Single Origin Policy (SOP) is an example of a policy that can be circumvented rather easily. In general, a security policy restricts what actions can be done by the various system processes. Abstractly, one can think of a policy as a set of allowed system executions. A policy for a web browser expresses what executions of the browser are allowed and which executions are not allowed as seen by an external observer. In other words, a policy on a web browser is a restriction on the input/output behavior of the browser.

A browser is susceptible to an attack relative to a security policy if some browser executions do not satisfy the security policy. Attacks are defined not in terms of the specific technical modalities to achieve them, but in terms of what can be achieved. In general, an attack requires the browser to get and process content from one or more attack origins. In describing an attack assume that there are at least three classes of origin: HIGH, LOW, and AUTH (authenticated). Also assume LOW is disjoint with both HIGH and AUTH, but HIGH and AUTH need not be disjoint. The following are attack models detectable by the system(s) described herein.

1. Information Leakage (Leakage): An attacker is able to launch an information leakage attack if a LOW origin is able to receive content from a HIGH origin through the browser.

2. Cross Site Request Forgery (CSRF): An attacker is able to launch a CSRF attack if requests to an AUTH origin to which the browser is already authenticated depends on content from a LOW origin.

3. Clickjacking (UI Redress): UI redress attack is similar to CSRF attack, but requires user participation by interacting with user interface elements. It is typically achieved by exploiting features of the user interface to let a user interact with a target website when they think that they are interacting with other content.

Use Model

Novice User

A security mechanism has a better chance to be effective if it is well understood and easy to use. This is especially true for novice users. Accordingly, the FBI system enables the processing of two types of sites for a novice user: sensitive sites and every other type of site. Access to a sensitive site is done through a dedicated FBI. Access to all other sites is done through separate browser instance(s) as it would be done without Auto-FBI. When a user attempts to access a sensitive website by clicking on a link or entering a URL directly in the address bar, an FBI is created to handle the access. When the user finishes accessing the sensitive site, the user can close the FBI or minimize it. If the user later attempts to access the sensitive site from another browser instance, a new instance is activated again, or, if there is an existing active instance for the site, that instance is used to process the request. For added security, the FBI may be opened without an address bar, menus or tabs to emphasize that the access is meant for only one site. This simple usage model is preferable to a model that requires the user to define security policies which is not uncommon in mechanisms that are claimed to be transparent.

Figure 6:
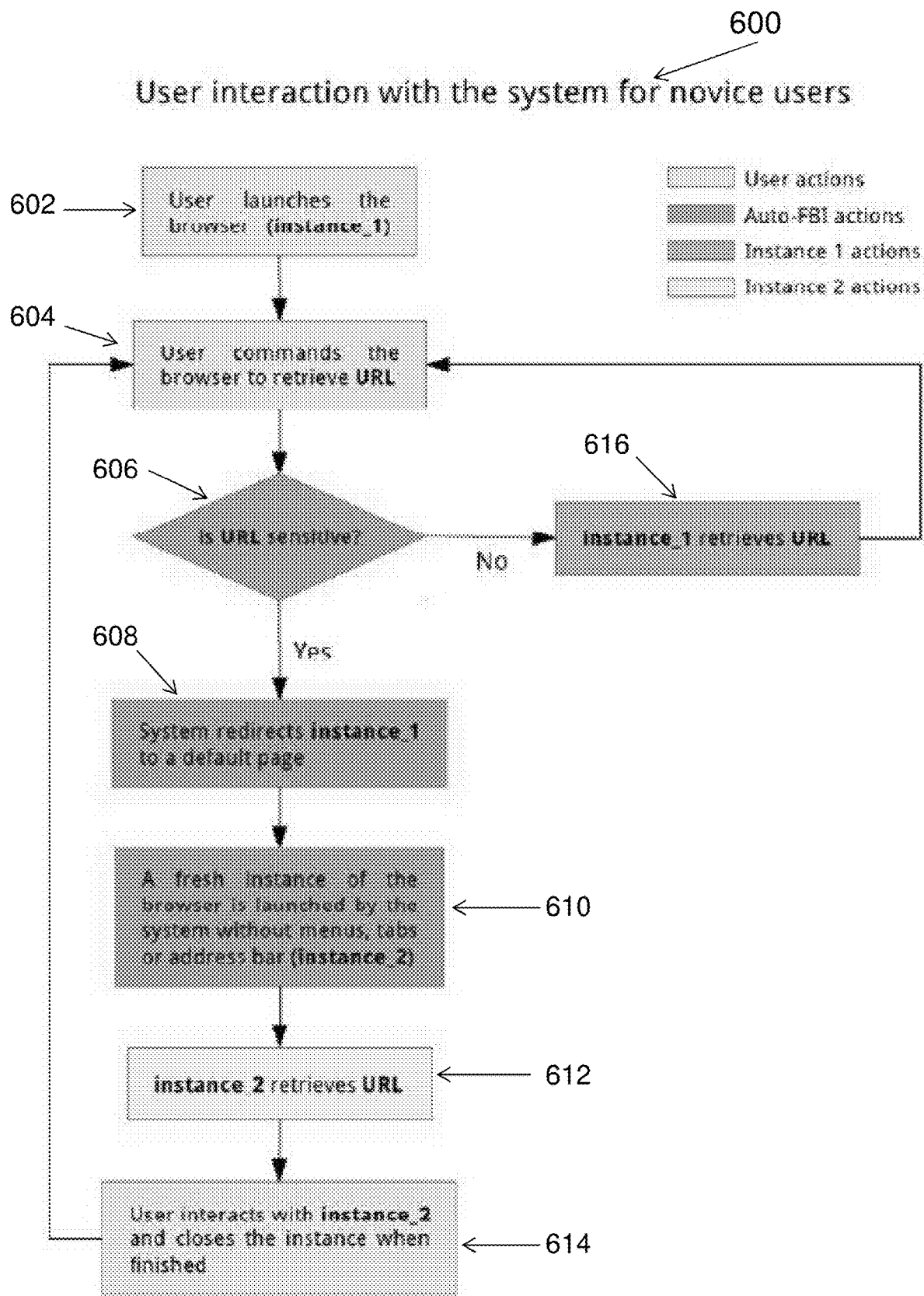
FIG. 6 is a flow chart illustrating one method of using the automatic FBI system for a novice user.

Access for a novice user is illustrated in a process flow 600 of FIG. 6, with reference to the browsers depicted in FIGS. 1 and 2. Referring initially to FIG. 6, a user launches a first browser instance at 602 and instructs the browser to retrieve a URL at 604. Referring to FIG. 1, a request is made to www.bankofamerica.com. Referring back to FIG. 6, the automatic FBI system determines if the URL is sensitive at 606 and if so, the automatic FBI system redirect the first browser instance to a default page at 608. If the URL is determined not to be sensitive, the first browser instance retrieves the URL at 616.

Referring back to FIG. 1, when a URL is sensitive, instead of displaying the requested page in the current instance browser 102, the automatic FBI system displays a message at 104. In the illustrated embodiment of FIG. 1, the message indicates that the requested website handles sensitive information and that a new browser window will be opened to handle the request for security reasons.

Alternatively, instead of displaying a warning message, as in the illustrated embodiment of FIG. 1, and to reduce mental overhead on the user, no message is displayed in the current instance.

Referring again to FIG. 6, a fresh second instance of the browser is automatically launched by the FBI system without menus, tabs, or address bars at 610 that retrieves the requested URL at 612. FIG. 2 illustrates that a requested page with sensitive content may be accessed by a fresh instance 202 of a different browser while the browser that made the original request displays a warning message, as illustrated at 104. Referring back to FIG. 6, once the URL has been served by the second instance, a user may interact with the web content and/or web page presented through the URL. In another embodiment, address bars and menus might still be made available to the user.

Experienced User

Figure 3:
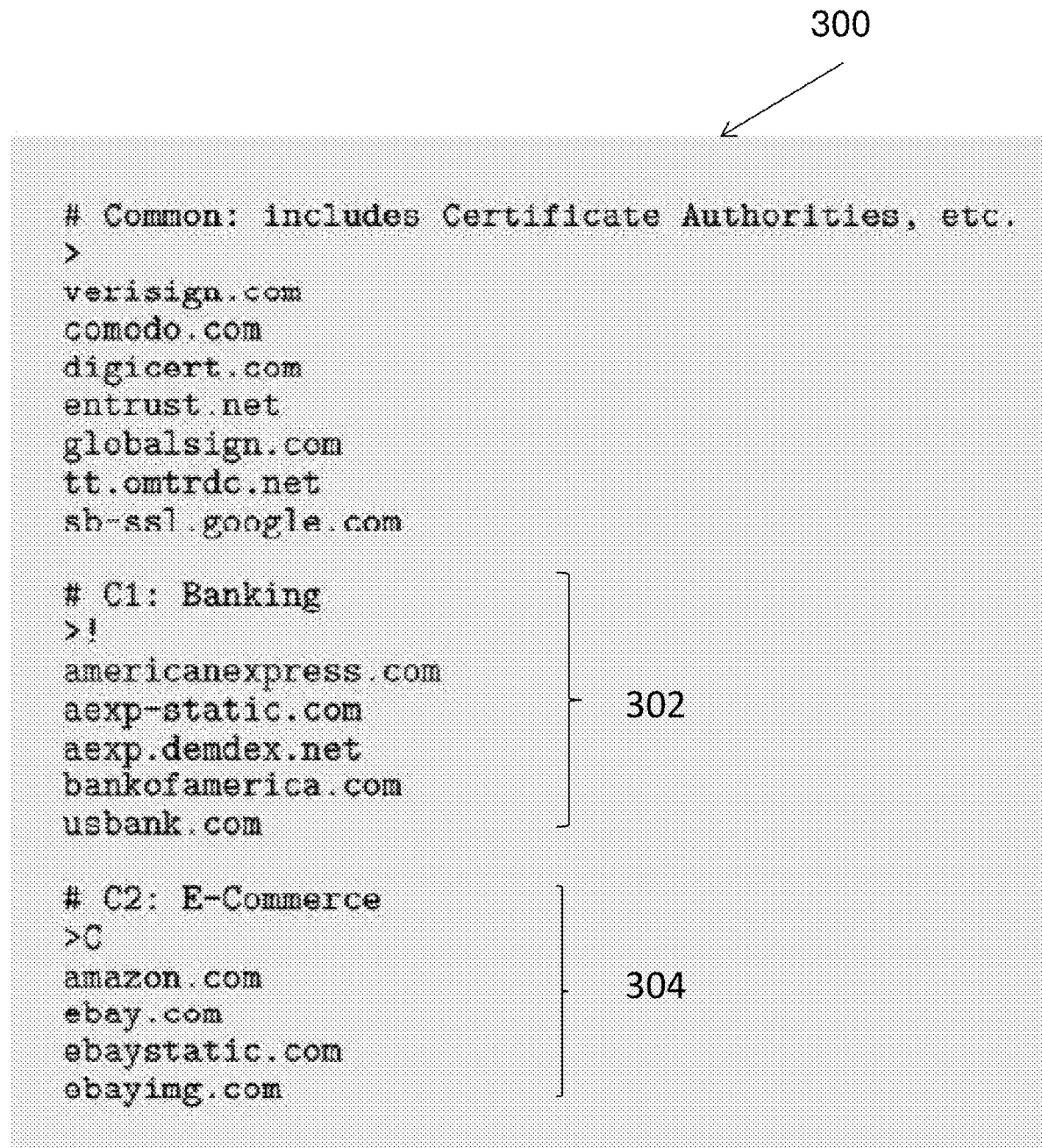
FIG. 3 is an example COI written by an experienced user.

For the experienced user, the FBI system allows content from more than one domain to coexist within a browser instance. The idea is to allow content originating from a conflict of interest (COI) class to coexist within a browser instance. As an example, an experienced user might define a COI class that contains some specific financial institutions and another class that contains some specific news sources. In a given browser instance, content from sources that belong to the same COI class can coexist as separate tabs or as content within the same page if a page links to content from multiple sources in the same COI class. An experienced user defines conflict of interest classes 300 in a classes file as illustrated in FIG. 3. The file consists of multiple sections, one for each COI class, but the first section specifies common domains, such as certificate authorities, that should be accessible by all COI classes. Each section starts with a line that defines the browser to be used followed by one or more lines that list the domains for the COI class. Any domain that does not appear explicitly in one of the COI classes or the first section is assumed to belong to an implicitly declared {\em general COI class. When a browser is launched by the user, it is associated with the general class. If the user attempts to access a site from a domain in a class other than the general class, then, if there is no active browser instance associated with that class, a new browser instance for that class is created to process and display the site. If there is an active browser instance for the class of the requested site, then the request is processed and displayed in that instance. To allow for using different browsers for different classes, e.g. using Google Chrome for e-commerce and Mozilla Firefox for banking, we specify the browser type rule that should be followed for each class with a type descriptor (that comes immediately after a in the sample file):

'F': Mozilla Firefox instance should be used
'C': Google Chrome instance should be used
'=': the launched browser instance should be the same type as the launcher
'!': the launched browser instance type should be different from that of the launcher
'_': places no restriction on the type of the browser The implicit general class has the implicit type descriptor '_', so both Google Chrome and Mozilla Firefox can be used to browse websites from the general class. While Google Chrome and Firefox have been provided as examples, it is contemplated that any type of internet browser, or any browser accessible by a user, may be used.

The example file shown in FIG. 3 has two explicit COI classes (we will refer to them as $C_1$ and $C_2$ as shown in the comments). The first class $C_1$ 302 has type descriptor '!' and the second class $C_2$ 304 has type descriptor 'C. To demonstrate the user experience, let's consider the following scenario: user opens Google Chrome to start browsing, an instance of Google Chrome of the general class is created. The user can navigate to any site that is not listed in $C_1$ 302 and $C_2$ 304 in that browser instance. If the user tries to navigate to www.bankofamerica.com which is listed in $C_1$ 302, a fresh instance of Mozilla Firefox will be created to handle the request. That is because the type descriptor for $C_1$ 302 specifies that an instance with a different type from that of the launcher (Google Chrome in this example) should be used. If the user tries to access www.facebook.com from the Mozilla Firefox instance, the request will be handled by the existing Google Chrome instance of the general class. That is because the general class has the implicit type descriptor '_' which allows the system to use the available instance. If the user navigates to www.ebay.com from any of the previous instances, a new instance of Google Chrome will be launched to handle the request regardless of the browser type used to initiate the request.

Figure 7:
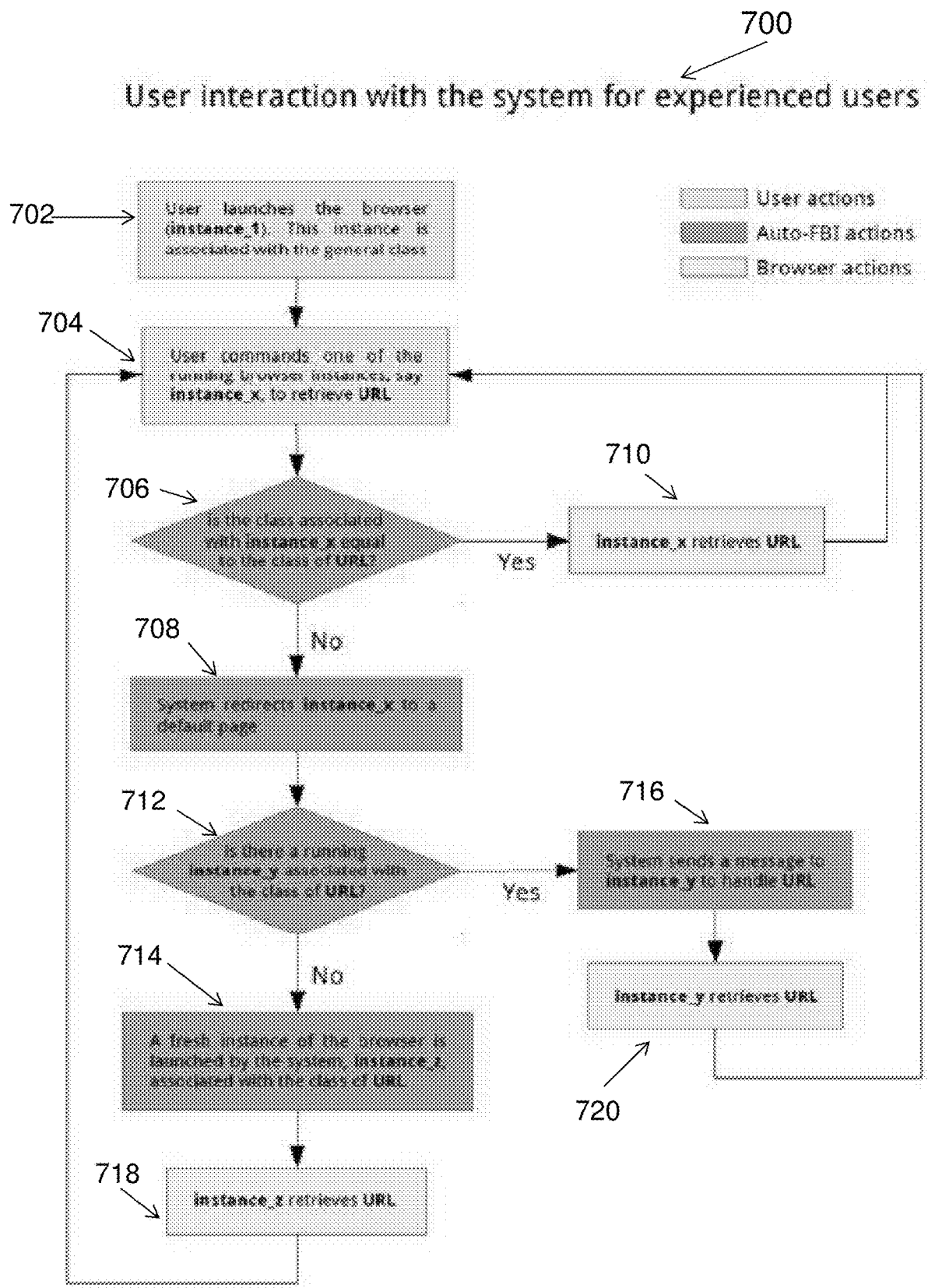
FIG. 7 is a flow chart illustrating another method of using the automatic FBI system for an experienced user.

Access for an experienced user is illustrated in a process flow 700 of FIG. 7. As illustrated, at 702, process 700 begins with a user launching a first browser instance (instance_1) that is associated with the general class. The FBI system then receives input requesting retrieval of a URL from a specific one of a set of running browser instances, instance X, at 704. If the class associated with instance X is the same as the class associated with the URL at 706, the instance X retrieves the URL at 710. When the class associated with instance X is not the same as the class associated with the URL, the FBI system directs instance X to a default page at 708. Subsequently, the FBI system determines whether there is a different browser instance, instance Y that is associated with the class of the URL at 714. If the class associated with instance Y is the same as the class associated with the URL, the FBI system sends a message to instance Y to handle the URL at 716 and instance Y retrieves the URL at 720. When the class associated with instance Y is not the same as the class associated with the URL, the FBI system directs instance Z to retrieve the URL at 718.

Thus the FBI system includes an enforcement mechanism with the ability to prevent a browser instance from communicating with sources that are not in its COI class and an enabler mechanism for starting FBI's as needed. The FBI system involves three main embodiments to provide the proposed functionality: (1) functionality included inside the browser through modification of the browser code; (2) functionality implemented as a browser extension; and/or (3) functionality implemented outside the browser.

Enforcement inside the browser: The desired functionality could be provided by modifying the browser to add the desired enforcement rules.

Enforcement in a browser extension: In a typical web browse (e.g., Chrome) extensions may be a combination of JavaScript and native code that is controlled by JavaScript.

Enforcement outside the browser: Enforcement outside the browser can be achieved by intercepting the browser's system calls and only allowing those calls that are according to policy. % Calls that cannot be processed within the current instance will be processed by creating an FBI to process them. Enforcement outside the browser does not preclude implementing part of the enabler mechanism inside the browser. In fact, for technical reasons that we explain later in this section, this is the approach we take. Compromising the enabler mechanism would not allow an attacker to access sensitive content through the wrong browser instance.

System Components

The system has two main components. One component, an enforcer, intercepts system calls and modifies them as needed to ensure that sensitive content is only accessed through the appropriate instance of the browser. Another component, an enabler determines when sensitive content is requested and, if needed, launches a new fresh instance of the browser to access the content.

Enforcer

Intercepting System Calls.

To intercept system calls, the system includes a ptrace API available in Linux. This API allows one program (tracer) to be notified and take control of every system call made by another program (browser). The kernel puts the browser to sleep when it makes a system call and notifies the tracer. The tracer can then modify the contents of process virtual memory or registers and then let the browser resume execution. When the system call gets executed and returns from the kernel, and before the control gets back to the browser, the kernel notifies the tracer once more. At this point the tracer can also modify the return value of the system call. Using this API enables us to control every interaction between the browser and the operating system. The ptrace API is also used by many sandboxing applications to control system access.

In one embodiment, the browser issues a connect system call when it needs to make a network connection, and it uses recvfrom or read to receive data from a network host.

Redirecting DNS Queries.

When a browser makes a DNS query, the tracer checks whether or not the requested network name is allowed to be accessed by the current browser instance. If it is not allowed to be accessed, the tracer changes the IP addresses in the DNS response to a predefined IP address which is the loopback address. This prevents the browser from connecting to the restricted website. At the same time, the attempted access is detected by the enabler mechanism of Auto-FBI and a new instance is launched as needed.

Intercepting IP Communication

The IP addresses used by the browser are not always preceded by DNS queries. In fact for security reasons, IP addresses obtained from DNS queries are typically cached (IP pinning) by browsers even if the TTL from the DNS response is set to 0.

IP addresses that are cached by the browser and obtained from a previous DNS query. IP addresses that are obtained through DNS queries are cached by Auto-FBI in a whitelist if the original DNS query is not redirected. A later use of such an IP address is compared against Auto-FBI's whitelist of IP addresses. If the IP address is not on the whitelist, it is blocked.

Browser hardcoded IP addresses. Hand-coded IP addresses. IP addresses that are directly entered by the user have legitimate usages such as setting up some LAN services (NAT setup for example). Such usages should be allowed. As a policy one can allow some LAN IP addresses and associate a class with each allowed address.

Figure 4:
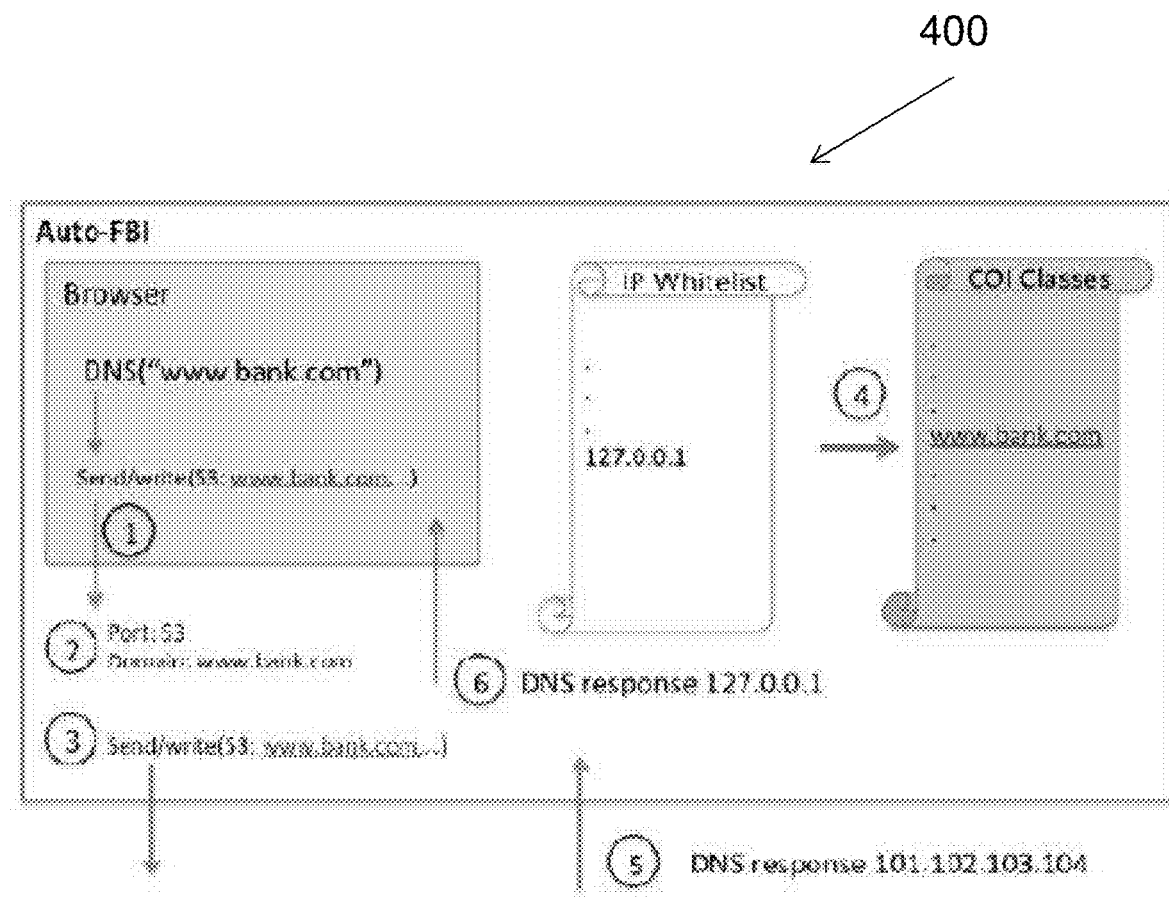
FIG. 4 is a simplified block diagram of the automatic FBI system.

FIG. 4 illustrates a scenario 400 in which a browser instance whose COI class is different from that of the website it is trying to connect to. First it makes a DNS query to resolve the IP address (1), the DNS response is detected by the system (2) and the requested domain name is checked against the list of COI classes (3). Since the browser is running in a different class, the system rewrites the IP address in the DNS response (4) and returns the result to the browser. The browser would not have access to the actual IP address for www.bank.com and hence it is not able to connect to it. The browser could not communicate directly with www.bank.com using the actual IP address of www-.bank.com because that IP address of www.bank.com is not added to the whitelist of the current instance.

Enabler: Launching Fresh Instances

To manage browser instances running in the system and launching new instances, the FBI system implements or otherwise includes a daemon which keeps track of all browser instances. The information on which new instances need to be launched comes from the extension component. The extension reports all URLs requested by the user to the daemon and also listens for incoming messages from the daemon in which case it will open the URL in a new tab. The daemon decide how to handle the URL sent by the extension: either open it in an existing browser instance by sending a message to the extension running in that instance or open a fresh instance in case an appropriate instance is not running.

As discussed in the previous section, having part of the enabler mechanism in the browser does not affect security. Even if a browser is compromised and the extension is also compromised, all that would affect is the URL communicated by the extension, but that has no effect on the tracing of system calls and blocking them. That part is independent and is enforced through a mechanism that is completely outside the browser by the Enforcer. So, compromising the browser might affect the progress requirement of the browser, but does not affect the safety requirements of the enforcement.

Security Guarantees

The FBI system restricts communication to IP addresses that are on the whitelist for the COI class of the executing browser instance. The IP addresses on the whitelist of one class can be one of the following: (1) IP addresses corresponding to a domain from the common domain list, or (2) IP addresses of a domain in the COI class. So, if DNS is not compromised, only content from sources in a given COI class can run on a browser instance associated with that class. For sensitive content whose servers are typically authenticated, the assumption on DNS not being compromised is not needed and the system provides the desired isolation that ensures that there is no leakage of sensitive content between various instances (assuming the authentication mechanism is secure). This means that attacks such as CSRF or Clickjacking cannot be used to access sensitive content. In fact, content (scripts) used to launch such attacks are assumed to belong to COI classes that are not part of the sensitive COI classes. This is especially evident in the novice user scenario. For the experienced user, a non-judicious choice of classes can pose a security risk.

Implementation Details

The prototype is composed of two separate modules: (1) Enforcer and (2) Enabler.

Enforcer

Using Linux ptrace API, the system may trace every system call made by a child process to keep track of the application's access to system resources including network and file system.

There are two options for a tracer to start tracing the tracee: (1) TRACEME and (2) ATTACH. The first option is usually used in the following way: the tracer forks a new child process and in the child process calls ptrace with TRACEME command, which causes it to be traceable by its parent process (the tracer), then it runs the target program by calling exec. The second option can be used to trace an already-running-process by attaching to it. The enforcer uses the TRACEME option by default (including the implementation for Firefox), but due to Chrome's use of the SETUID access flag in its sandboxing process, the enforcer uses the ATTACH option with GOOGLE Chrome. Using ATTACH leaves an enforcement gap: from the time that the tracer launches Chrome until the tracer attached to the browser, the browser is not traced. Using ATTACH leaves an enforcement gap: from the time that tracer launches Chrome until the tracer attaches to the browser, the browser is not traced. This should not be a source of vulnerability if the default home pages are safe. Using ATTACH means that part of the enforcer that is involved in setting up the tracing is browser dependent, but the rest of the enforcement when the ATTACH option is used and the whole enforcement using the TRACEME option are generic and not dependent on the browser. The ptrace API allows one to trace a process and all its child processes and threads by specifying certain options: PTRACE_O_TRACEFORK and PTRACE_O_TRACE-CLONE. So the system can make sure that a process cannot escape the tracer by creating a child process or a new thread.

For every system call made by the tracee, the tracer is notified twice: once before the call is handed over to the kernel for execution and once after the call returns from the kernel but before it is handed back to the tracee. So the tracer has two chances to modify a system call: it can change the parameters provided by the tracee to the kernel, or change the values returned by the kernel. To restrict the browser's access to websites, the system may monitor the following system calls: itemize Connect: Connects a socket file descriptor to a network address. It is also used for IPC.
rcvfrom: Receives data through a socket file descriptor
read: Can be used to receive data from the network (through a socket file descriptor)

DNS Queries

To prevent the browser from accessing certain websites, the system keeps track of the DNS queries made by the browser to find out if it is trying to connect to a restricted website. The system can prevent the access by rewriting the IP addresses in the DNS response to point to a predefined address.

In order to accomplish this, the system needs to process the following system calls: rcvfrom and read. (Depending on the browser, other system calls such as rcvmsg and rcvmmsg may need to be processed). If the port number matches the port number of the DNS protocol, the system read the IO buffer from the tracee's memory and analyzes the DNS message. If the system decide to rewrite the IP addresses in the DNS message, the system do so by writing to the tracee's virtual memory.

IP White-List

To prevent the browser from connecting to a restricted website by using a hard-coded IP address, the system employs a white-list of IP addresses that the browser is allowed to connect to.

Initially, it is populated with the DNS service IP address (usually the local DNS client, 127.0.0.1) and a list of pre-defined IP addresses (to allow for LAN addresses). When the browser makes a DNS query, one of the following happens: either the response is changed to prevent access in case the URL is not allowed or the IP addresses in the response are added to the white-list. When the browser issues a connect system call, the system would only allow it to go through if the IP address is in the white-list. By doing this, the system ensures that the browser does not circumvent the system mechanisms by connecting to a hard coded IP address directly.

Enabler
Browser Extension

All browser instances are equipped with an extension that is responsible for two tasks: (1) report all user-requested URLs to the daemon and (2) open a new tab for URLs requested by the daemon. When the extension reports a URL to the daemon, the daemon decides if the URL should be handled by the reporting instance or by another instance. The system has developed separate JavaScript extensions for Mozilla Firefox and Google Chrome. Since the extensions cannot directly communicate with the daemon, the system has a native application written in C that is responsible for forwarding messages between the daemon and the extension. The native application communicates at one end with the browser extension through the browser API Native Messaging API in case of Google Chrome and in js-ctypes API in case of Mozilla Firefox) and it communicates with the daemon on the other end through Unix Domain Sockets. The native application's process is a child process of the browser instance and hence can be considered a part of the browser extension module. It is interesting to note that the code size of the extension (and its associated native application) is small compared to that of the enforcer: around 3K lines of code for the enforcer and daemon vs. 460 for the chrome extension and 280 for the Firefox extension.

Daemon

The daemon is a multi-threaded C program that uses Unix Domain Sockets to communicate with browser extensions. It is responsible for deciding how to handle restricted URLs by either dispatching it to an already-running instance that is allowed to access the URL or creating a fresh new instance. For every browser instance running in the system, it has a separate thread to communicate with the instance. It keeps a record for each running browser instance along with a queue of outgoing messages for that instance in a shared data structure. When it receives a message from a browser extension, it chooses to either send a message to the browser extension in one of the running browser instances or run a fresh instance. It compares the COI class of the URL contained in the incoming message with that of the sender. If they match, it ignores the message because the sender will not be blocked when attempting to access the URL; otherwise it decides how to handle the message according to the classes file.

Browser Instances and User Profiles

A browser instance is associated with a profile that captures its execution state. In practice, most browsers support user profiles to enable the multi-user use case. User profiles are very similar in different browsers: a folder stored somewhere in the user's home directory that contains information such as the user's web history, cookies, cache, and preferences. Fortunately, most browsers also provide a way of using multiple profiles for a user in addition to the user's default profile. In case of Mozilla Firefox and Google Chrome, creating a fresh instance of the browser is as easy as creating an empty directory and instructing the browser to use that directory to store the user profile (though this would be cumbersome to do manually). In one embodiment, the default user profile (the one managed by the user) is associated with the general COI class. Other COI classes do not necessarily have a persistent profile: a temporary profile can be created whenever the instance is created and can be deleted after the instance is closed. Alternatively, profiles for COI classes can be kept when the browser is closed. The user spends most of the time using the default profile since most URLs fall into the general COI category, hence allowing the user to manage that profile improves usability. Using temporary profiles for other COI classes ensures tighter security without much effect on usability.

System Architecture

In some embodiments, any suitable hardware can be used to provide one or more portions of the components and functions described above, and such hardware can be implemented in one or more general purpose devices such as a computer or a special purpose device such as a client, a server, etc. Any of these general or special purpose devices can include any suitable components such as a hardware processor (which can be a microprocessor, digital signal processor, a microcontroller, etc.), memory, communication interfaces, display controllers, input devices, etc., and can be configured to operate in response to software instructions consistent with the functionality described herein.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Figure 8:
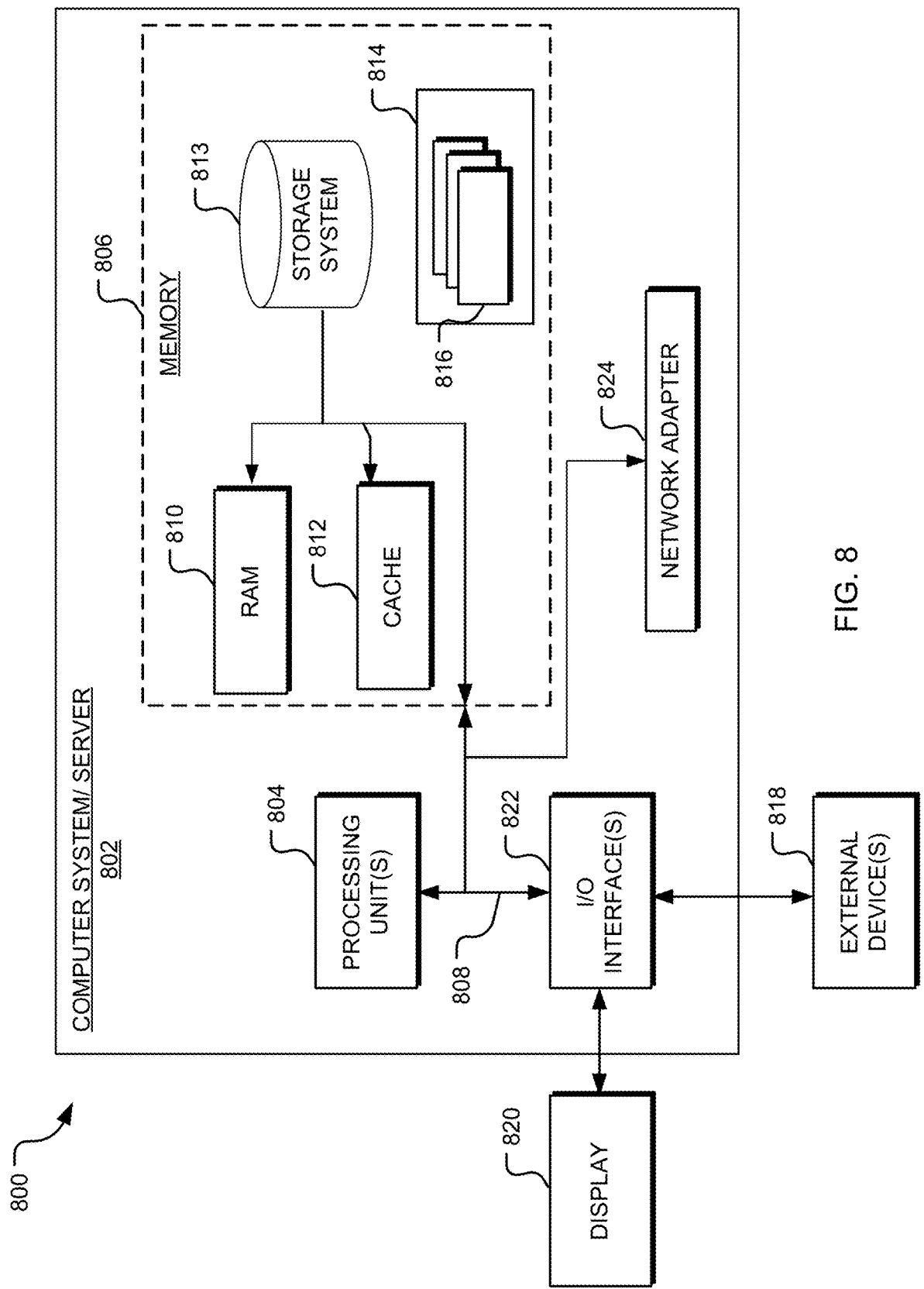
FIG. 8 is a block diagram of a computing system.

FIG. 8 illustrates an example of a computing node 800 which may comprise an implementation of the system 201. The computing node 800 represents one example of a suitable computing device and is not intended to suggest any limitation as to the scope of use or functionality of embodiments of the invention described herein. Regardless, the computing node 800 is capable of being implemented and/or performing any of the functionality described above.

As illustrated, the computer node 800 includes a computer system/server 802, which is operational with numerous other general purpose or special purpose computing system environments or configurations. Examples of well-known computing systems, environments, and/or configurations that may be suitable for use with computer system/server 802 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in computing node 800 is shown in the form of a general-purpose computing device. The components of computer system/server 802 may include one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 may include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, and external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system, comprising:
   a processor, operable to:
      receive data defining a first web content class and a second web content class, the first web content class defining a first plurality of Uniform Resource Locators (URLs), and the second web content class defining a second plurality of URLs different than the first plurality of URLs, the second web content class further being associated with sensitive information presenting a security risk;
      generate a first browser instance, the first browser instance defining a browser instance type predetermined to be associated with the first web content class;
      intercept a request to access web content from the first browser instance, the request defining a URL of the second plurality of URLs such that the web content is associated with the second web content class;
      confirm that the URL is not being accessed by another separate already-running browser instance associated with the second web content class, by:
         implementing a daemon outside the first browser instance that tracks active browser instances and launches a new browser in order to manage web access according to the data defining the first web content class and the second web content class,
         receiving the request via a browser extension associated with the first browser instance,
         forwarding the request from the browser extension to the daemon using a native application,
         confirming, via the daemon that the web content is not associated with the first web content class and that another browser instance is not already launched and available to access the web content; and
      launch a new browser for accessing the web content associated with the second web content class to provide access to the URL of the second plurality of URLs via the new browser.

2. The system of claim 1, wherein the new browser instance is launched automatically for display, and the web content is associated with a web server.

3. The system of claim 2, wherein the processor is operable to execute an API call configured to intercept a system call to the web server, the system call to the web server intended to provide access of the URL to the first browser instance.

4. The system of claim 3, further comprising:
   wherein the processor is operable to pause operations associated with the first browser instance upon interception of the system call; and
   wherein the API controls system calls made by other programs and other browser instances.

5. The system of claim 1, wherein the processor is operable to implement a tracer to determine whether or not a requested network object is allowed to be accessed by the first browser instance.

6. The system of claim 1, wherein the daemon comprises a multi-threaded C program that uses Unix domain sockets to communicate with the browser extension and other extensions.

7. A method for facilitating different categories of content to be displayed in different independent browser instances, the method comprising:
   utilizing a processor in communication with a non-transitory tangible storage medium storing instructions that are executed by the processor to perform operations comprising:
      accessing data defining rules for delegating web access associated with a first content class to a first browser type and delegating web access associated with a second content class to a second browser type;
      identifying a request to access an IP address by a first browser instance, the first browser instance being of the first browser type;
      determining that the IP address is associated with the second content class such that the IP address should not be accessed by the first browser instance and confirming that a separate browser instance is not already in use and available to access the request, by:
         implementing a daemon, the daemon comprising a multi-threaded program executed outside the first browser instance that tracks active browser instances and launches a new browser instance in order to manage according to the rules,
         receiving the request via a browser extension associated with the first browser instance,
         forwarding the request from the browser extension to the daemon using domain sockets; and
      generating a second browser instance to access the IP address, the second browser instance being of the second browser type.

8. The method of claim 7, wherein the second browser instance is launched automatically to a client device for display.

9. The method of claim 7, further comprising:
executing an API call configured to intercept a system call to a web server associated with the IP address, the system call initiated by the first browser instance.

10. The method of claim 7, further comprising:
executing a tracer to determine whether or not a requested network object is allowed to be accessed by the first browser instance.

11. The method of claim 7, further comprising:
generating a domain name system (DNS) query to resolve the IP address;
determining that the IP address is associated with the second content class; and
issuing a DNS response, the IP address being rewritten in the DNS response to prevent the first browser instance from accessing the IP address and information of the second content class; and
returning the IP address as rewritten to the first browser instance.

12. A non-transitory computer readable medium encoded with a set of instructions for facilitating different categories of content to be displayed in different independent browser instances, the set of instructions, executable by a processor, comprising:
accessing data associating a first web content class with a first browser type and a second web content class with a second browser type;
accessing a request to access web content via a first browser instance, the first browser instance being of the first browser type; and
comparing the web content to the first web content class and the second web content class to determine whether the web content is accessible to the first browser instance, by
implementing a daemon, the daemon comprising a multi-threaded program executed outside the first browser instance that tracks active browser instances and launches a new browser instance in order to manage according to the rules,
receiving the request via a browser extension associated with the first browser instance,
forwarding the request from the browser extension to the daemon using domain sockets.

13. The non-transitory computer readable medium of claim 12, further comprising:
generating a second browser instance to access the web content,
wherein the second browser instance is launched automatically to a client device for display.

14. The non-transitory computer readable medium of claim 12, further comprising:
executing an API call configured to intercept a system call to a web server,
the system call associated with the first browser instance.

15. The non-transitory computer readable medium of claim 12, further comprising:
executing a tracer to determine whether or not the first browser instance is authorized to access a requested network.

16. The non-transitory computer readable medium of claim 12, wherein the second web content class is associated with sensitive information indicating that accessing the web content by the first browser instance presents a security risk.

17. The non-transitory computer readable medium of claim 12, wherein the first web content class is associated with a first plurality of URLs and the second web content class is associated with a second plurality of URLs, the first plurality of URLs being different from the second plurality of URLs.

18. The non-transitory computer readable medium of claim 12, wherein the data further defines rules limiting web access by the first browser instance to URLs defined by the first web content class.

\* \* \* \* \*